W. KRAFVE.
REAR CONSTRUCTION FOR AUTOMOBILE TRUCKS.
APPLICATION FILED JULY 10, 1920.
1,404,977.
Patented Jan. 31, 1922.
2 SHEETS—SHEET 2.
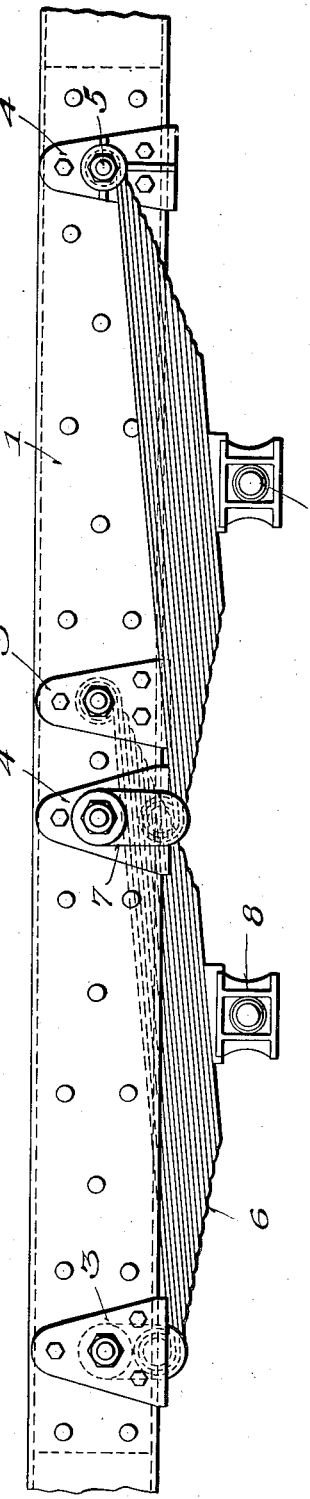
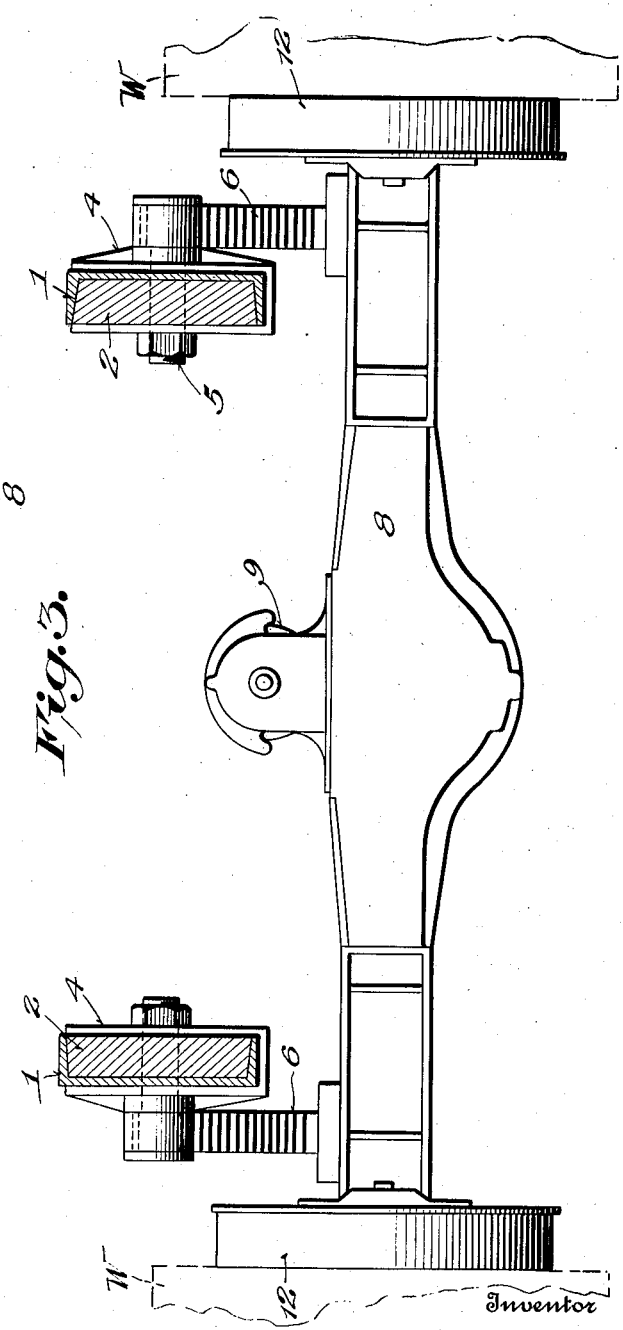
Inventor
William Krafve
By Joseph A. Miller
Attorney

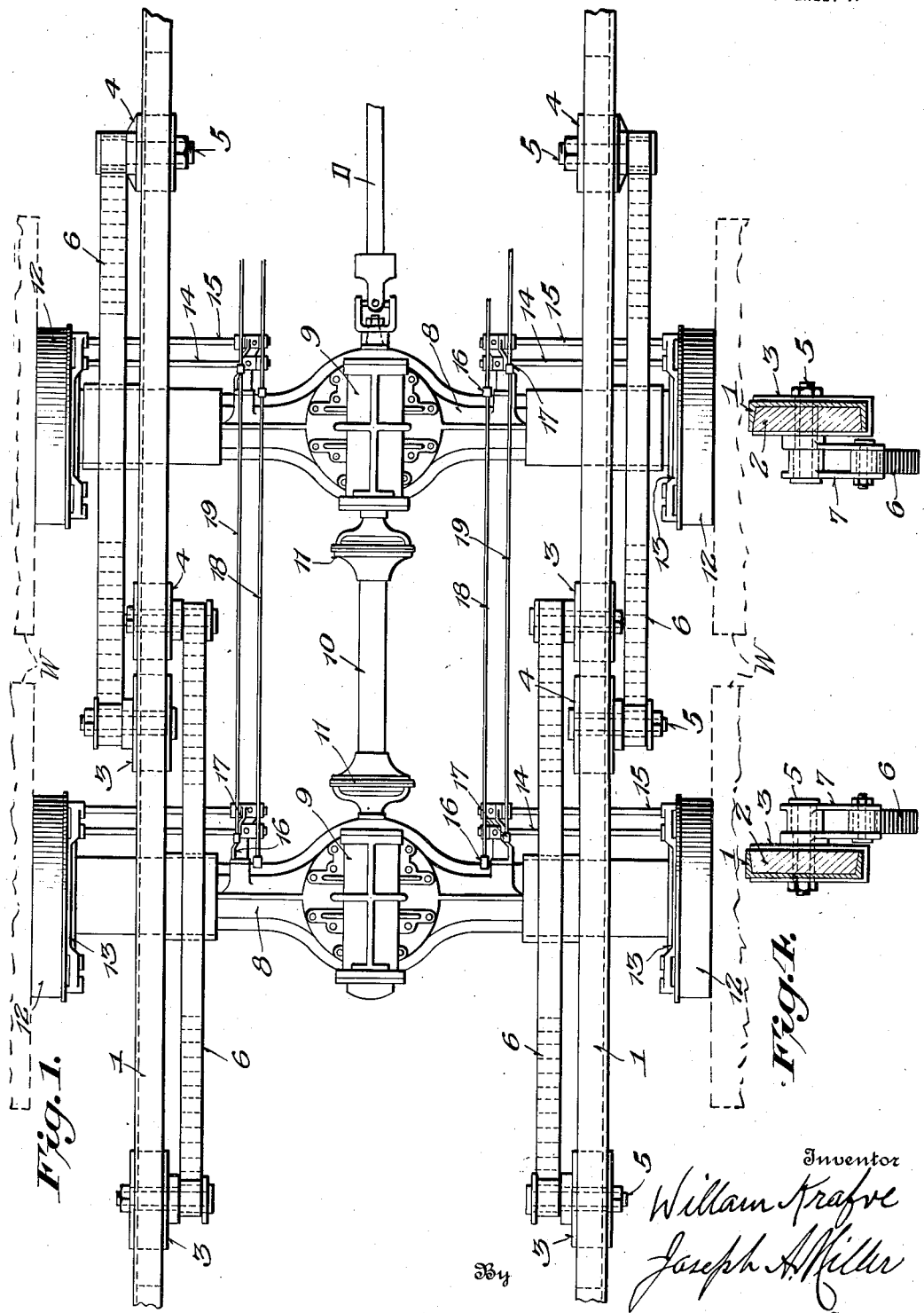

UNITED STATES PATENT OFFICE.

WILLIAM KRAFVE, OF FALL RIVER, MASSACHUSETTS.

REAR CONSTRUCTION FOR AUTOMOBILE TRUCKS.

1,404,977. Specification of Letters Patent. Patented Jan. 31, 1922.

Application filed July 10, 1920. Serial No. 395,183.

*To all whom it may concern:*

Be it known that I, WILLIAM KRAFVE, a citizen of the United States, residing at Fall River, in the county of Bristol and State of Massachusetts, have invented new and useful Improvements in a Rear Construction for Automobile Trucks, of which the following is a specification.

This invention relates to certain new and useful improvements in a rear construction for automobile trucks, and it has for an object to provide a novel four wheel rear drive for a motor vehicle having independent spring mountings for the two sets of wheels whereby the vehicle will travel smoothly over rough or irregular road surfaces.

A further object is to provide a continuous or direct drive for each unit or set of rear wheels embodying a worm transmission for each set of wheels connected to the companion worm by a shaft and universal couplings, whereby should one set of wheels become disabled the companion set will effectively serve to propel the vehicle.

The invention further resides in the lay-out of the springs and the provision of the double set of brakes for the better riding and control of the vehicle.

In the drawing:

Figure 1 is a plan view of the improved rear running gear:

Figure 2 is a side elevation thereof:

Figure 3 is an end elevation thereof showing the disposition of one set of springs: and Figure 4 is a similar view depicting the other set of springs.

Referring more in detail to the drawings, the side frame members 1 of the chassis have their rear portions reinforced by filler pieces 2 to provide parallel side faces which are embraced by the U-clips 3 and 4.

Bolts 5 are inserted through bearings 6, in the clips, and registering openings in the composite chassis frame members. the bolts which are supported by clips 3 extending inwardly, and those which are supported by clips 4 extending outwardly to provide stub shafts or trunnions for the forward and rearward sets of springs. The springs 6 are of the leaf type and their forward ends are pivoted direct to the stub-shaft-forming bolts while their opposite rear ends are suspended from the remaining bolts by links 7 which are normally vertical. This construction provides a novel arrangement of independently operable springs, slightly inclined upwardly in a forward direction, to cushion better the perpendicular and horizontal shocks of the vehicle, and disposed on opposite sides of each chassis side bar.

The rear axle constructions 8 are secured to the springs and have centrally disposed worm transmissions 9, the worms of which extend in alinement lengthwise of the vehicle and are connected by shaft 10 and universal joints 11 and are driven by a shaft D. On the outer ends of the axles are fixed the brake wheels 12 within which are arranged the expanding brake bands 13 for expansion and contraction by the rock shafts 14 and 15, the brake wheels being carried by the usual wheels W indicated in fragment in dotted lines. The inner ends of these shafts are equipped with arms 16 and 17 connected to the companion arms of the forwardly disposed set by operating rods 18 and 19. Thus, the brakes of both sets are operable concurrently in the efficient braking or stopping of a vehicle.

The lay-out of the springs is practical and substantial, the rear set of wheels being carried on the inside springs while the forward set is arranged to support the outside wheels. The axles are independently yieldable and mounted whereby the incapacitating of one set of wheels will not effect the functioning of the other set, i. e. one set can be removed without interfering with the operation of the companion set. By providing two sets of wheels for the rear, a smoother riding of the vehicle is obtained, since if the forward set of wheels should enter a hole or depression in the road bed, the rear set would then take the load unaffected by and without affecting the forward set and its springs.

Having thus described my invention, what I claim as new and desire to secure by Letters Patent is:—

1. In a rear construction for trucks, enabling operation thereof from either the front or rear axle upon disabling of either, a chassis, a front and a rear axle therefor each having wheels thereon, spring means for supporting each axle from the chassis and for permitting independent movement of each axle relative to the chassis, a drive for each axle, a shaft extending between the drives, universal couplings between the ends of the shaft and the drives whereby to cause positive operation of each drive regardless of the movement of each axle, the spring means for supporting each axle being completely independent of each other whereby to allow each to function regardless of whether the wheels of either axle be removed or not, braking means for each axle, and common means for actuating each to enable operation of either regardless of disabling of the other.

2. In a rear construction for trucks, enabling operation thereof from either the front or rear axle upon disabling of either, a chassis, a front and rear axle therefor each having wheels thereon, spring means for supporting each axle from the chassis and for permitting independent movement of each axle relative to the chassis, a drive for each axle, a flexible connection between the drives whereby to cause positive operation of each drive regardless of the movement of each axle, the spring means for supporting each axle being completely independent of each other whereby to allow each to function regardless of whether the wheels of either axle be removed or not, braking means for each axle, and common means for actuating each to enable operation of either regardless of disabling of the other.

In testimony whereof I have signed my name to this specification in the presence of two subscribing witnesses.

WILLIAM KRAFVE.

Witnesses:
E. P. TOOMEY,
J. A. MILLER.